(12) United States Patent
Xu

(10) Patent No.: US 11,902,897 B2
(45) Date of Patent: Feb. 13, 2024

(54) METHOD FOR TRANSMITTING SIGNAL, NETWORK APPARATUS, AND TERMINAL APPARATUS

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 69 days.

(21) Appl. No.: 17/124,154

(22) Filed: Dec. 16, 2020

(65) Prior Publication Data

US 2021/0105721 A1 Apr. 8, 2021

Related U.S. Application Data

(63) Continuation of application No. PCT/CN2018/093171, filed on Jun. 27, 2018.

(51) Int. Cl.
*H04W 52/02* (2009.01)
*H04W 76/28* (2018.01)
(Continued)

(52) U.S. Cl.
CPC ..... *H04W 52/0229* (2013.01); *H04W 56/001* (2013.01); *H04W 68/005* (2013.01);
(Continued)

(58) Field of Classification Search
CPC ........... H04W 52/0229; H04W 56/001; H04W 68/005; H04W 72/005; H04W 72/042;
(Continued)

(56) References Cited

U.S. PATENT DOCUMENTS

2012/0275364 A1 11/2012 Anderson et al.
2015/0003311 A1 1/2015 Feuersaenger et al.
(Continued)

FOREIGN PATENT DOCUMENTS

CN 103636264 A 3/2014
CN 107431982 A 12/2017
(Continued)

OTHER PUBLICATIONS

Huawei et al., "Status Report to TSG", Jun. 11-14, 2018, 3GPP, 3GPP TSG RAN meeting #80, La Jolla, USA, RP-180849 (Year: 2018).*

(Continued)

*Primary Examiner* — Michael K Phillips
(74) *Attorney, Agent, or Firm* — PERKINS COIE LLP

(57) ABSTRACT

Disclosed in an implementation of the present disclosure are a method for transmitting a signal, a network apparatus, and a terminal apparatus. The method comprises: a network apparatus determining transmission resources for one or more power saving signals, wherein the one or more power saving signals are associated with one or more first signals, or the transmission resources for the one or more power saving signals are associated with one or more time units; and the network apparatus respectively transmitting the one or more power saving signals on the transmission resources therefor.

15 Claims, 3 Drawing Sheets

200 A network device determines a resource for sending at least one power saving signal, the at least one power saving signal is associated with at least one first signal, or the resource for sending the at least one power saving signal is associated with at least one time unit ～ 210

The network device sends the at least one power saving signal on the resource for sending the at least one power saving signal respectively ～ 220

(51) Int. Cl.
  *H04W 56/00* (2009.01)
  *H04W 68/00* (2009.01)
  *H04W 72/0453* (2023.01)
  *H04W 72/23* (2023.01)
  *H04W 72/30* (2023.01)

(52) U.S. Cl.
  CPC ....... *H04W 72/0453* (2013.01); *H04W 72/23* (2023.01); *H04W 72/30* (2023.01); *H04W 76/28* (2018.02)

(58) Field of Classification Search
  CPC ............. H04W 72/0453; H04W 76/28; H04W 52/0235; H04W 52/02; H04W 68/00; H04W 52/0212; H04W 72/0446; H04W 72/23; H04W 72/30; Y02D 30/70
  See application file for complete search history.

(56) References Cited

U.S. PATENT DOCUMENTS

| | | |
|---|---|---|
| 2016/0088681 A1 | 3/2016 | Chang et al. |
| 2016/0373237 A1 | 12/2016 | Shellhammer et al. |
| 2017/0325167 A1 | 11/2017 | Lu et al. |
| 2018/0007734 A1 | 1/2018 | Kela et al. |
| 2018/0098287 A1 | 4/2018 | Ang et al. |
| 2018/0270756 A1* | 9/2018 | Bhattad ............. H04W 52/0235 |
| 2019/0059056 A1* | 2/2019 | Islam ...................... H04L 5/001 |
| 2019/0090193 A1* | 3/2019 | Liu ...................... H04W 52/028 |
| 2019/0254110 A1* | 8/2019 | He ...................... H04L 41/0896 |
| 2019/0297577 A1* | 9/2019 | Lin ................... H04W 52/0216 |
| 2019/0342833 A1* | 11/2019 | Åström .................... H04W 8/24 |
| 2020/0029302 A1* | 1/2020 | Cox ....................... H04W 68/02 |
| 2020/0229095 A1* | 7/2020 | Shrestha ................. H04W 8/08 |
| 2020/0359322 A1* | 11/2020 | Hwang ............. H04W 52/0229 |

FOREIGN PATENT DOCUMENTS

| | | | |
|---|---|---|---|
| CN | 107820721 A | | 3/2018 |
| EP | 3257321 A1 | | 12/2017 |
| EP | 3257321 B1 | | 1/2020 |
| JP | 2017516356 A | | 6/2017 |
| JP | 2017537516 A | | 12/2017 |
| KR | 20140040741 A | | 4/2014 |
| WO | 2010124444 A1 | | 11/2010 |
| WO | 2016146147 A1 | | 9/2016 |
| WO | WO-2019179261 A1 * | | 9/2019 |

OTHER PUBLICATIONS

Pan et al., "Information Transmission Method, Terminal and Network Device", Sep. 26, 2019, WO, English translation of WO 2019179261. (Year: 2019).*

Examiner's Report for Canadian Application No. 3,104,555 dated Dec. 8, 2021. 5 pages.
Notification of Reason for Refusal for Korean Application No. 10-2020-7036792 dated Oct. 14, 2021. 10 pages with English translation.
"Radio Resource Control (RRC) protocol specification (Release 15)", 3GPP TS 38.331 V15.2.1, Jun. 2018.
Examination Report for European Application No. 18924500.4 dated Feb. 9, 2022. 5 pages.
Examination Report No. 1 for Australian Application No. 1 for Australian Application No. 2018430324 dated Feb. 8, 2022. 3 pages.
Notice of Allowance for Korean Application No. 10-2020-7036792 dated Apr. 14, 2022. 3 pages with English translation.
Notice of Reasons for Refusal for Japanese Application No. 2020-570819 dated Apr. 4, 2022. 8 pages with English translation.
International Search Report dated Mar. 27, 2019 of PCT/CN2018/093171 (4 pages).
LG Electronics. "Discussion on Wake Up Signal in MTC" 3GPP TSG RAN WGJ Meeting #93 RI-1806587, May 25, 2018 (May 25, 2018) (5 pages).
ZTE Corporation. "Remaining Issues on Wake-up Signal" 3GPP TSG-RAN WG2 Meeting#102 R2-1807667, May 25, 2018 (May 25, 2018) (3 pages).
First Examination Report dated Jul. 27, 2021 of Indian Patent Application No. 202017054953 (5 pages).
Supplementary European Search Report dated May 26, 2021 of European Patent Application No. EP18924500 (9 pages).
Examination Report for European Application No. 18924500.4 dated Jul. 29, 2022. 6 pages.
Examination Report No. 2 for Australian Application No. 2018430324 dated Jul. 26, 2022. 4 pages.
First Office Action for Chinese Application No. 202110589961.0 dated Jul. 28, 2022. 33 pages with English translation.
Huawei et al. "Remaining details on NR RRM" R1-1803630; 3GPP TSG RAN WG1 Meeting #92bis; Sanya, China; Apr. 16-20, 2018. 7 pages.
MediaTek Inc. "Miscellaneous Issues of NB-IOT Wake Up Signal" R2-1805101; 3GPP TSG RAN WG2 Meeting #101bis; Sanya, China; Apr. 16-20, 2018. 5 pages.
Office Action for Taiwanese Application No. 108122707 dated Jul. 19, 2022. 18 pages with English translation.
ZTE "Considerations on DL reference signals and channels design for NR-U" R1-1806460; 3GPP TSG RAN WG1 Meeting #93; Busan, Korea; May 21-25, 2018. 7 pages.
Ericsson "Wake Up Signal" R2-1807773; 3GPP TSG-RAN2 Meeting #102; Busan, South Korea; May 21-25, 2018. 6 pages.
Notice of Reasons for Refusal for Japanese Application No. 2020-570819 dated Nov. 15, 2022. 6 pages with English translation.
Second Office Action for Chinese Application No. 202110589961.0 dated Oct. 21, 2022. 37 pages with English translation.
EP Office Action dated Feb. 8, 2023 in EP App. 18924500.4.

* cited by examiner

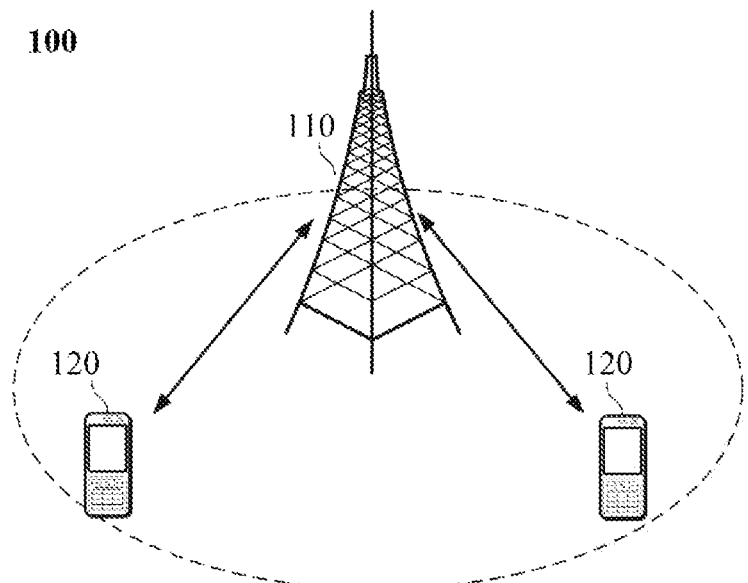

FIG. 1

200 — A network device determines a resource for sending at least one power saving signal, the at least one power saving signal is associated with at least one first signal, or the resource for sending the at least one power saving signal is associated with at least one time unit ~ 210

The network device sends the at least one power saving signal on the resource for sending the at least one power saving signal respectively ~ 220

FIG. 2

300 — A terminal device determines a resource for receiving at least one power saving signal, the at least one power saving signal is associated with at least one first signal, or the resource for receiving the at least one power saving signal is associated with at least one time unit ~ 310

The terminal device receives the at least one power saving signal on the resource for receiving the at least one power saving signal respectively ~ 320

FIG. 3

METHOD FOR TRANSMITTING SIGNAL, NETWORK APPARATUS, AND TERMINAL APPARATUS

CROSS-REFERENCE TO RELATED APPLICATION

This application is a continuation application of International Application No. PCT/CN2018/093171 filed on Jun. 27, 2018, of which the entire disclosure is hereby incorporated by reference.

TECHNICAL FIELD

Implementations of the present disclosure relate to the communication field, in particular to a method for transmitting a signal, a network device and a terminal device.

BACKGROUND

In order to reduce power consumption of a terminal, a Discontinuous Reception (DRX) mechanism is introduced so that the terminal need not to turn on a receiver all the time if no data is to be received, but enters a discontinuous reception state, thus achieving a purpose of power saving. A terminal in an idle state needs to receive a paging message in a similar way as DRX. There is one paging occasion (PO) within one DRX cycle. The terminal only receives the paging message in the PO, but does not receive the paging message at time outside the PO, so as to achieve the purpose of power saving.

With evolution of communication systems, a higher requirement is put forward for power saving of a terminal. For example, for an existing DRX mechanism, the terminal needs to constantly detect a Physical Downlink Control Channel (PDCCH) in each on duration to determine whether a base station schedules data transmission sent to the terminal. However, for most terminals, there may be no need to receive data transmission for a very long period of time, but it is still necessary to keep a regular wake-up mechanism to monitor possible downlink transmission. For such terminals, there is a room for further optimization of power saving. It is similar for the terminal in the idle state which receives a paging message.

With regard to the DRX mechanism, an indication signal may be sent to the terminal before an on duration, and the terminal will perform PDCCH detection and data reception in the on duration of DRX only after detecting the indication signal, otherwise, not perform the PDCCH detection. The indication signal is also called a power saving signal (WUS). Similarly, for the terminal in the idle state to receive a paging message, it is determined whether a PDCCH needs to be detected on a PO by detecting a power saving signal before the PO. At present, there is no specific implementation on how to send the power saving signal.

SUMMARY

Implementations of the present disclosure provide a method for transmitting a signal, a network device and a terminal device.

In a first aspect, a method for transmitting a signal is provided. The method includes that a network device determines a resource for sending at least one power saving signal, wherein the at least one power saving signal is associated with at least one first signal, or the resource for sending the at least one power saving signal is associated with at least one time unit, and the network device sends the at least one power saving signal on the resource for sending the at least one power saving signal respectively.

In a second aspect, a method for transmitting a signal is provided. The method includes that a terminal device determines a resource for receiving at least one power saving signal, wherein the at least one power saving signal is associated with at least one first signal, or the resource for receiving the at least one power saving signal is associated with at least one time unit, and the terminal device receives the at least one power saving signal on the resource for receiving the at least one power saving signal respectively.

In a third aspect, a network device is provided. The network device is configured to perform the method in the above first aspect or each implementation thereof.

Specifically, the network device includes function modules for performing the method in the above first aspect or each implementation thereof.

In a fourth aspect, a terminal device is provided. The terminal device is configured to perform the method in the above second aspect or each implementation thereof.

Specifically, the terminal device includes function modules for performing the method in the above second aspect or each implementation thereof.

In a fifth aspect, a network device is provided. The network device includes a processor and a memory. The memory is configured to store a computer program, and the processor is configured to call and run the computer program stored in the memory to execute the method in the above first aspect or each implementation thereof.

In a sixth aspect, a terminal device is provided. The terminal device includes a processor and a memory. The memory is configured to store a computer program, and the processor is configured to call and run the computer program stored in the memory to execute the method in the above second aspect or each implementation thereof.

In a seventh aspect, a chip is provided. The chip is configured to implement the method in any one of the above first to second aspects or each implementation thereof.

Specifically, the chip includes a processor, configured to call and run a computer program from a memory to make a device provided with the chip perform the method in any one of the above first to second aspects or each implementation thereof.

In an eighth aspect, a computer readable storage medium is provided, which is configured to store a computer program, the computer program causes a computer to perform the method in any one of the above first to second aspects or each implementation thereof.

In a ninth aspect, a computer program product is provided, which includes computer program instructions, the computer program instructions cause a computer to perform the method in any one of the above first to second aspects or each implementation thereof.

In a tenth aspect, a computer program is provided, which, when being run on a computer, causes the computer to perform the method in any one of the above first to second aspects or each implementation thereof.

BRIEF DESCRIPTION OF DRAWINGS

FIG. 1 is a schematic diagram of architecture of a communication system according to an implementation of the present disclosure.

FIG. 2 is a schematic diagram of a method for transmitting a signal according to an implementation of the present disclosure.

FIG. 3 is another schematic diagram of a method for transmitting a signal according to an implementation of the present disclosure.

DETAILED DESCRIPTION

Figure 4:
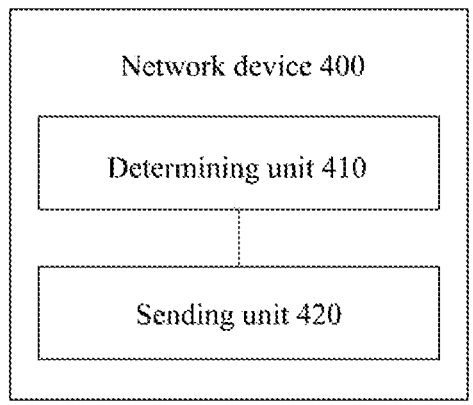
FIG. 4 is a schematic block diagram of a network device according to an implementation of the present disclosure.

The technical solution in implementations of the present disclosure will be described below with reference to the accompanying drawings in the implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

Technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Illustratively, a communication system 100 which an implementation of the present disclosure is applied to is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN).

The communication system 100 also includes at least one terminal device 120 located in the coverage area of the network device 110. A terminal device used herein includes but is not limited to a User Equipment (UE), an access terminal, a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, a vehicle-mounted device, a wearable device, a terminal device in a future 5G network, or a terminal device in a future evolved Public Land Mobile Network (PLMN), etc., which is not restricted in implementations of the present invention.

Optionally, a Device to Device (D2D) communication may be performed between the terminal devices 120.

Optionally, the 5G system or 5G network may be referred to as a New Radio (NR) system or a NR network.

FIG. 1 exemplifies one network device and two terminal devices. Optionally, the communication system 100 may include multiple network devices, and other quantity of terminal devices may be included within a coverage area of each network device, which is not limited in implementations of the present disclosure.

Optionally, the communication system 100 may include other network entities such as a network controller, and a mobile management entity, which is not limited in implementations of the present disclosure.

It should be understood that, a device with a communication function in a network/system in an implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated herein. The communication device may further include other devices in the communication system 100, for example, other network entities such as network controllers, mobile management entities, etc., which is not limited in the implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In order to reduce power consumption of a terminal, there is a DRX mechanism in both LTE and NR systems so that the terminal need not to turn on a receiver all the time if no data is to be received, but enters a discontinuous reception state, thus achieving a purpose of power saving. The DRX mechanism includes configuring a DRX cycle for a UE in a connected state, and one DRX cycle consists of "On Duration" and "Opportunity for DRX". During "On Duration" time, the UE monitors and receives downlink channels and signals including a PDCCH; and during "Opportunity for DRX" time, the UE does not receive downlink channels and signals such as the PDCCH to reduce power consumption. The UE in the idle state needs to receive a paging message in a similar way as DRX. There is one paging occasion (PO) within one DRX cycle. The UE only receives a paging message in the PO, but do not receive a paging message at time outside the PO to achieve a purpose of power saving.

During the PO, the UE determines whether there is a paging message by detecting a PDCCH signal scrambled by a Paging Radio Network Temporary Identity (P-RNTI).

In evolution of a 5G system, a higher requirement is put forward for power saving of a UE. For example, for an existing DRX mechanism, the UE needs to constantly detect PDCCH during each on duration to determine whether a base station schedules data transmission sent to the UE. However, for most UEs, there may be no need to receive data transmission for a very long period of time, but it is still necessary to keep a regular wake-up mechanism to monitor possible downlink transmission. For such UEs, there is a room for further optimization of power saving. It is similar for the UE in the idle state which receives a paging message.

If a base station determines that a terminal needs to be scheduled in an on duration of DRX, the base station may send an indication signal to the terminal before the on duration, otherwise, it will not send the indication signal to the terminal. The terminal will perform PDCCH detection and data reception in the on duration of DRX only after detecting the indication signal, otherwise, it will not perform the PDCCH detection. The above indication signal is beneficial to power saving of the terminal, which is also referred to a WUS. At this time, the UE only needs to detect a power saving signal to determine whether a PDCCH needs to be detected in the on duration, which may save power compared with directly detecting the PDCCH. Similarly, for a UE in the idle state to receive a paging message, it is determined whether a PDCCH needs to be detected on a PO by detecting a power saving signal before the PO.

FIG. 2 is a schematic flow chart of a method 200 for transmitting a signal according to an implementation of the present disclosure. As shown in FIG. 2, the method 200 includes part or all of following contents of actions S210 and S220.

In S210, a network device determines a resource for sending at least one power saving signal, wherein the at least one power saving signal corresponds to at least one first signal one to one, or the resource for sending the at least one power saving signal corresponds to at least one time unit one to one.

In S220, the network device sends the at least one power saving signal on the resource for sending the at least one power saving signal respectively.

Specifically, the network device may associate power saving signals with some existing downlink signals, or associate resources for sending the power saving signals with some existing time units, so that a terminal device may obtain the resources for sending the power saving signals according to such association relationship, thus receive corresponding power saving signals. For example, the network device may associate the power saving signal with a Synchronization Signal (SS)/physical broadcast channel (PBCH) Block or a Channel State Information-Reference Signal (CSI-RS), or may also associate the power saving signal with other reference signals. The network device may also associate the resources for sending the power saving signals with some time units. That is to say, a positional relationship between some time units and the resources for sending the power saving signals is configured in advance, and when positions of these time units are obtained, the resources for sending the power saving signals may naturally be obtained.

It should be understood that the association here may also mean that the power saving signal itself is the first signal, for example, the power saving signal may be an SS/PBCH block, a reference signal such as a CSI-RS, etc., or a PDCCH itself, or a channel or signal occupying a candidate resource of the PDCCH. Once knowing the resource for sending the first signal, the terminal device may obtain the resource for sending the power saving signal.

It should be noted that the power saving signal in the implementation of the present disclosure is essentially an indication signal, which may be the aforementioned WUS or other signals, for example, an existing SS/PBCH block, a CSI-RS or a PDCCH, or a channel or signal occupying a candidate resource of the PDCCH may be reused. That is, as long as the terminal device receives or does not receive such SS/PBCH block, CSI-RS or PDCCH or the channel or signal occupying the candidate resource of the PDCCH, the terminal device may determine not to detect PDCCH in a corresponding receiving window. The network device and the terminal device may agree on such a rule in advance, and the implementation of the present disclosure does not limit a specific expression mode of the power saving signal.

For example, for a terminal in an idle state, the power saving signal may be a wake-up signal, the wake-up signal is used for waking up the terminal, and a timing relationship between the wake-up signal and a PO may be configured by the network device.

In NR, a beamforming technology is introduced to offset a higher path loss caused by a high frequency and improve coverage. That is to say, sending of a signal has a certain beam direction. In order to send a power saving signal to a UE within a cell, a beamforming mode may also be used. For a UE in a connected state, a network knows a beam direction of the UE, thus a corresponding beam may be used to send a power saving signal to the UE. For a UE in an idle state, the network does not know a beam direction of the UE, and can only send a power saving signal by beam scanning. However, whatever the above cases, the power saving signals all need to be sent through multiple beams.

Optionally, the network device may determine resources for sending multiple power saving signals and send the multiple power saving signals. Different power saving signals of the multiple power saving signals may use different beams.

The network device may associate the multiple power saving signals with multiple first signals, and the multiple first signals may be signals sent with different beams. Specifically, resources for sending multiple power saving signals may be determined according to an association relationship between the first signals and the power saving signals. For example, the network device may configure a positional relationship between a set of resources for sending power saving signals and a set of SS/PBCH blocks, and then may determine the resources for sending the power saving signals according to positions of the SS/PBCH blocks. It should be understood that each power saving signal herein may correspond to one SS/PBCH block or multiple SS/PBCH blocks, and multiple SS/PBCH blocks corresponding to a power saving signal may use a same beam, while multiple SS/PBCH blocks corresponding to different power saving signals may use different beams. For another example, the network device may configure a positional relationship between a set of resources for sending power saving signals and a set of CSI-RS resource blocks, and then may determine the resources for sending the power saving signals according to positions of the CSI-RS resource blocks. It should be understood that each power saving signal herein may correspond to one CSI-RS resource block or multiple CSI-RS resource blocks, and multiple CSI-RS resource blocks corresponding to a power saving signal may use a same beam, while multiple CSI-RS resource blocks corresponding to different power saving signals may use different beams.

For example, since the power saving signals need to be sent through different beams, in order to enable the terminal device to receive a corresponding power saving signal, it is needed to let the terminal device determine a resource position at which the power saving signal is located, which includes at least one of a time unit such as a subframe, a frequency domain position such as a physical resource block (PRB), and a sequence. For the terminal device, a receiving beam may be determined by receiving an SS/PBCH block (SSB). Since the SS/PBCH block is sent by way of beam scanning, the terminal device determines the receiving beam according to an index of the received SS/PBCH block, thereby receiving WUS i according to a resource position of the WUS i having an association relationship with SS/PBCH block index i. In the same way, the WUS i sent by the network device has an association relationship with the SS/PBCH block index i. The power saving signal may also have an association relationship with a CSI-RS, that is, the WUS i may be related to CSI-RS index i.

Optionally, in an implementation of the present disclosure, a quantity of first signals actually sent by the network device to the terminal device may be smaller than a maximum quantity of first signals capable of being sent to the terminal device, that is, the at least one first signal is a subset of a first set, the first set may be configured by the network device or agreed by a protocol. The network device may select a part of the first signals from the first set to actually send in combination with an actual situation. Then the network device may further indicate information of the first signal actually sent to the terminal device, such as position information of the first signal actually sent. After receiving the information of the first signal actually sent by the network device, the terminal device may not only determine a receiving position of the first signal, but also determine a receiving position of a power saving signal according to an association relationship between the first signal and the power saving signal. The information of the first signal actually sent by the network device may also be used for the terminal device to perform rate matching with a power saving signal associated with the first signal in the first set. That is to say, after receiving the information of the first signal sent by the network device, the terminal device may perform rate matching with the power saving signal associated with the first signal in the first set. For example, the terminal device may receive other signals on a time-frequency resource of the power saving signal associated with the first signal in the first set except for the first signals actually sent by the network device. Taking the SS/PBCH Block as an example, in an NR system, an SS/PBCH block burst is defined, and one SS/PBCH block burst contains L SS/PBCH blocks. A value of L may be different for different system frequency bands. However, L is only a maximum quantity of SS/PBCH blocks, and a quantity of SS/PBCH blocks actually sent by the network may be less than L, the actually sent SS/PBCH blocks need to be indicated to the UE for the UE to perform rate matching, and the time-frequency resource positions at which SS/PBCH blocks are not sent may be used for transmission of other channels, such as a physical downlink shared channel (PDSCH). At the same time, when the UE performs rate matching, on a time-frequency resource position of an actually sent SS/PBCH block, the time-frequency resource may be considered to be incapable of being used for transmission of other channels. In the NR system, a position of an actually sent SS/PBCH block may be determined by an SSB-Transmitted parameter. Information of SSB-Transmitted of the actually sent SS/PBCH block may be indicated through Remaining Minimum System Information (RMSI) or through information of ssb-PositionsInBurst in a Radio Resource Control (RRC) signaling. A way of indication may be a bitmap. For different frequency bands, lengths of the bitmap are different. For a frequency band below 3 GHz, an indication of a 4 bit shortBitmap may be used, for a frequency band between 3 GHz and 6 GHz, an indication of a 8 bit mediumBitmap may be used, and for a frequency band above 6 GHz, an indication of a 64 bit longBitmap may be used, which respectively correspond to positions of actually sent SS/PBCH blocks among 4, 8 and 64 SS/PBCH blocks contained in one SS/PBCH block burst. The network device may decide the actually sent SS/PBCH blocks according to an actual situation, for example, coverage of corresponding beams is performed by considering a distribution of UEs within a cell, etc., thus overhead caused by SS/PBCH blocks and their associated signals may be reduced. WUSs may be associated with the actually sent SS/PBCH blocks, which may also reduce overhead. Therefore, the terminal device may determine a resource of the WUS according to configuration of the network device and information of the actually sent SS/PBCH blocks.

Optionally, in an implementation of the present disclosure, the network device may directly send information of an actually sent power saving signal to the terminal device, so that the terminal device may directly determine a resource for receiving the power saving signal according to the information of the actually sent power saving signal, and then may further perform rate matching according to resource information of the actually sent power saving signal.

In addition, the network device may associate the multiple power saving signals with multiple time units, and signals sent in the multiple time units may be signals sent using different beams. Specifically, resources for sending the multiple power saving signals may be determined according to an association relationship between the resources for sending the power saving signals and the time units. For example, the network device may configure a positional relationship between a set of resources for sending power saving signals and a set of time units, and then determine the resources for sending the power saving signals according to positions of the set of the time units. It should be understood that each power saving signal herein may correspond to one time unit or multiple time units, and multiple time units corresponding to a power saving signal may use a same beam, while multiple time units corresponding to different power saving signals may use different beams.

For example, a paging message also needs to be sent by beam scanning, that is, one PO may include multiple time units or resource sets, and different time units or resource sets have association relationships with different SS/PBCH blocks or CSI-RSs respectively. Herein, a so-called resource set includes resources of both a time dimension and a frequency domain dimension. That is to say, one time unit corresponds to one resource set, and the resource set is one corresponding time unit in a time domain.

Optionally, in an implementation of the present disclosure, the above association relationship may be a Quasi co-location (QCL) relationship.

For two antenna ports, if a large-scale characteristic of a radio channel on which symbols are sent through one of the antenna ports may be inferred from a radio channel on which symbols are sent through the other antenna port, then the two antenna ports may be regarded as quasi co-location. The large-scale characteristic, namely QCL information, includes at least one of following parameters: a Doppler shift, a Doppler spread, an average delay, a delay spread and a Spatial Rx parameter. That is, when two antenna ports are QCL, this means that the large-scale characteristic of the radio channel of one antenna port corresponds to the large-scale characteristic of the radio channel of the other antenna port. Considering multiple antenna ports through which Reference Signals (RSs) are sent, when antenna ports through which two different types of RSs are sent are QCL, a large-scale characteristic of a radio channel of one antenna port may be replaced by a large-scale characteristic of a radio channel of the other antenna port.

Assuming that A is a reference signal and B is a target signal, if B is quasi-co-located with A about the above large-scale parameter, the UE may estimate a quasi-co-located large-scale parameter from A, and then B may use the large-scale parameter for a subsequent operation.

Optionally, resources for sending different power saving signals among multiple power saving signals determined by the network device are different, for example, different in at least one of following aspects: a sending time unit, a frequency domain position and a sequence. A resource for sending each power saving signal is determined by the network device. For example, the network device may configure an association relationship between a power saving signal and a corresponding first signal or time unit, thus the terminal device may determine the resource for sending the power saving signal according to the association relationship to receive the corresponding power saving signal.

For the network device, at least one power saving signal determined by the network device is directed to one sending window. The sending window may be a DRX sending window, that is, the above "on duration". The sending window may also be a paging opportunity, or a PDCCH listening window, that is, a PDCCH search space, etc. For the terminal device, the at least one power saving signal is directed to one receiving window, herein the receiving window may be a DRX sending window, a paging occasion or a PDCCH listening window, etc. Once receiving the at least one power saving signal, the terminal device may detect a PDCCH in a corresponding receiving window. If not receiving the at least one power saving signal, the terminal device will not detect the PDCCH in the corresponding receiving window.

It should be understood that the at least one power saving signal may also be used for indicating to the terminal device that PDCCH detection is not performed in one corresponding receiving window. That is to say, once receiving the at least one power saving signal, the terminal device does not detect the PDCCH in the corresponding receiving window. If not receiving the at least one power saving signal, the terminal device detects the PDCCH in the corresponding receiving window.

The receiving window corresponding to at least one power saving signal involved herein may be a first receiving window after the at least one power saving signal, or another receiving window after the at least one power saving signal, or multiple receiving windows after the at least one power saving signal, which is not limited by the implementation of the present disclosure.

Specifically, for the terminal device in the idle state, the receiving window is a paging opportunity. Then the terminal device may receive multiple power saving signals, and finally determine its own power saving signal. And for the terminal device in the connected state, the receiving window may be a DRX sending window. Since both the network device and the terminal device know a beam direction belonging to the terminal device, that is to say, the terminal device may directly receive its own power saving signal. However, for a terminal device which is mobile and in the connected state, the terminal device may also receive multiple power saving signals.

Optionally, in an implementation of the present disclosure, since there are different requirements for minimum time intervals between power saving signals and receiving windows corresponding to capabilities of different terminal devices, for a terminal device, a resource for receiving the power saving signal may be further determined according to a capability of the terminal device.

It should be understood that the first signal in the implementation of the present disclosure may be the SS/PBCH Block or the CSI-RS mentioned above, or other signal transmitted using a beam, or a signal associated with the SS/PBCH Block or the CSI-RS, or the PDCCH, which is not limited by the implementation of the present disclosure. And the time unit in the implementation of the present disclosure may be the time unit in the PO mentioned above, or a resource occupied by other signal transmitted by a beam, or a resource associated with the SS/PBCH Block or the CSI-RS, which is not limited by the implementation of the present disclosure.

Therefore, the method for transmitting a signal of the implementation of the present disclosure associates power saving signals with some existing signals, or associates resources for sending power saving signals with some existing time units, which is beneficial to improving reliability of receiving power saving signals by a terminal device.

FIG. 3 is a schematic flow chart of a method 300 for transmitting a signal according to an implementation of the present disclosure. As shown in FIG. 3, the method 300 includes part or all of following contents of actions S310 and S320.

In S310, a terminal device determines a resource for receiving at least one power saving signal, wherein the at least one power saving signal is associated with at least one first signal, or the resource for receiving the at least one power saving signal is associated with at least one time unit.

In S320, the terminal device receives the at least one power saving signal on the resource for receiving the at least one power saving signal respectively.

Therefore, the method for transmitting a signal of the implementation of the present disclosure associates power saving signals with some existing signals, or associates resources for sending power saving signals with some existing time units, which is beneficial to improving reliability of receiving power saving signals by a terminal device.

Optionally, in an implementation of the present disclosure, the at least one first signal is a first subset of a first set, and the method further includes: the terminal device receives information of the at least one first signal sent by the network device; determining, by the terminal device the resource for receiving the at least one power saving signal, includes: the terminal device determines the resource for receiving the at least one power saving signal according to the information of the at least one first signal.

Optionally, in an implementation of the present disclosure, the method further includes: the terminal device performs rate matching with the power saving signal associated with the first signal in the first set according to information of the at least one first signal.

Optionally, in an implementation of the present disclosure, performing, by the terminal device, the rate matching with the power saving signal associated with the first signal in the first set according to the information of the at least one first signal includes: the terminal device receives a signal other than the power saving signal on a resource for receiving the power saving signal associated with a second subset of the first set, herein the second subset includes a first signal other than the at least one first signal in the first set.

Optionally, in an implementation of the present disclosure, the first signal includes a synchronization signal/physical broadcast channel (SS/PBCH) block and/or a channel state information reference signal (CSI-RS), the at least one time unit is a time unit in a first paging occasion (PO).

Optionally, in an implementation of the present disclosure, the power saving signal and the first signal are quasi-co-located, and the power saving signal and a signal sent in the time unit are quasi-co-located.

Optionally, in an implementation of the present disclosure, the at least one power saving signal is multiple power saving signals, and any two power saving signals in the multiple power saving signals are different in at least one of following aspects: a sending time unit, a frequency domain position, and a sequence.

Optionally, in an implementation of the present disclosure, the sending time unit, the frequency domain position or the sequence are configured by the network device.

Optionally, in an implementation of the present disclosure, the method further includes: the terminal device performs PDCCH detection within a receiving window corresponding to the at least one power saving signal according to the at least one power saving signal; or the terminal device does not perform PDCCH detection within a receiving window corresponding to the at least one power saving signal according to the at least one power saving signal.

Optionally, in an implementation of the present disclosure, the receiving window includes a Discontinuous Reception (DRX) sending window, a paging occasion or a PDCCH search space.

Optionally, in an implementation of the present disclosure, determining, by the terminal device, the resource for receiving the at least one power saving signal includes: the terminal device determines the resource for receiving the at least one power saving signal according to a capability of the terminal device.

It should be understood that the interaction with the network device, related characteristics and functions of the terminal device described for the terminal device correspond to related characteristics and functions of the network device. That is to say, whatever messages the network device sends to the terminal device, the terminal device receives the corresponding messages from the network device.

It should be understood that, in various implementations of the present disclosure, sequence numbers of each process described above do not mean execution orders. An execution order of each process should be determined according to functions and internal logic of the process, and should not be construed as any limitation on implementation processes of the implementations of the present disclosure.

The method for transmitting a signal according to the implementations of the present disclosure has been described in detail above. An apparatus for transmitting a signal according to implementations of the present disclosure will be described below with reference to FIGS. 4 to 7, and technical features described in the method implementations are applicable to following apparatus implementations.

FIG. 4 shows a schematic block diagram of a network device 400 according to an implementation of the present disclosure. As shown in FIG. 4, the network device 400 includes a determining unit 410 and a sending unit 420.

The determining unit 410 is configured to determine a resource for sending at least one power saving signal, wherein the at least one power saving signal is associated with at least one first signal, or the resource for sending the at least one power saving signal is associated with at least one time unit.

The sending unit 420 is configured to send the at least one power saving signal on the resource for sending the at least one power saving signal respectively.

Optionally, in an implementation of the present disclosure, the at least one first signal is a first subset of a first set, and the sending unit is further configured to send information of the at least one first signal to a terminal device, the information of the at least one first signal is used for the terminal device to determine the resource for sending the power saving signal associated with the at least one first signal.

Optionally, in an implementation of the present disclosure, the information of the at least one first signal is further used for the terminal device to perform rate matching with the power saving signal associated with the first signal in the first set.

Optionally, in an implementation of the present disclosure, the first signal includes a synchronization signal/physical broadcast channel (SS/PBCH) block and/or a channel state information reference signal (CSI-RS), and the at least one time unit is a time unit in a first paging occasion (PO).

Optionally, in an implementation of the present disclosure, the power saving signal and the first signal are quasi-co-located, and the power saving signal and a signal sent in the time unit are quasi-co-located.

Optionally, in an implementation of the present disclosure, the at least one power saving signal is multiple power saving signals, and any two power saving signals in the multiple power saving signals are different in at least one of following aspects: a sending time unit, a frequency domain position, and a sequence.

Optionally, in an implementation of the present disclosure, the sending time unit, the frequency domain position or the sequence are configured by the network device.

Optionally, in an implementation of the present disclosure, the at least one power saving signal is used for indicating whether PDCCH detection is required or not within a sending window corresponding to the at least one power saving signal.

Optionally, in an implementation of the present disclosure, the sending window includes a Discontinuous Reception (DRX) sending window, a paging occasion or a PDCCH search space.

It should be understood that the network device 400 according to the implementation of the present disclosure may correspond to the network device in the method implementation of the present disclosure, and the above and other operations and/or functions of various units in the network device 400 are respectively for implementing corresponding processes of the network device in the method shown in FIG. 2, which will not be repeated herein for brevity.

Figure 5:
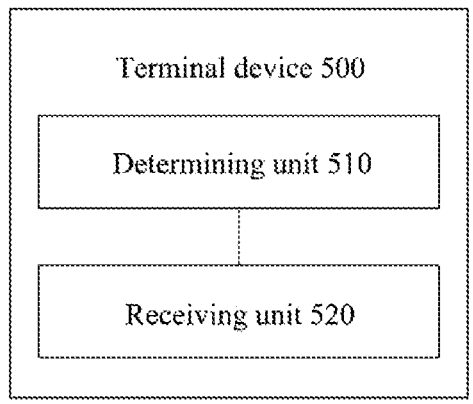
FIG. 5 is a schematic block diagram of a terminal device according to an implementation of the present disclosure.

FIG. 5 shows a schematic block diagram of a network device 500 according to an implementation of the present disclosure. As shown in FIG. 5, the network device 500 includes a determining unit 510 and a receiving unit 520.

The determining unit 510 is configured to determine a resource for receiving at least one power saving signal, wherein the at least one power saving signal is associated with at least one first signal, or the resource for receiving the at least one power saving signal is associated with at least one time unit.

The receiving unit 520 is configured to receive the at least one power saving signal on the resource for receiving the at least one power saving signal respectively.

Optionally, in an implementation of the present disclosure, the at least one first signal is a first subset of a first set, the at least one first signal is a first signal to be sent by the network device, and the receiving unit is further configured to: receive information of the at least one first signal sent by the network device; the determining unit is specifically configured to determine the resource for receiving the at least one power saving signal according to the information of the at least one first signal.

Optionally, in an implementation of the present disclosure, the terminal device further includes a rate matching unit.

The rate matching unit is configured to perform rate matching with the power saving signal associated with the first signal in the first set according to the information of the at least one first signal.

Optionally, in an implementation of the present disclosure, the rate matching unit is specifically configured to receive a signal other than the power saving signal on a resource for receiving the power saving signal associated with a second subset of the first set, the second subset includes a first signal other than the at least one first signal in the first set.

Optionally, in an implementation of the present disclosure, the first signal includes a synchronization signal/physical broadcast channel (SS/PBCH) block and/or a channel state information reference signal (CSI-RS), and the at least one time unit is a time unit in a first paging occasion (PO).

Optionally, in an implementation of the present disclosure, the power saving signal and the first signal are quasi-co-located; and the power saving signal and a signal sent in the time unit are quasi-co-located.

Optionally, in an implementation of the present disclosure, the at least one power saving signal is multiple power saving signals, and any two power saving signals in the multiple power saving signals are different in at least one of following aspects: a sending time unit, a frequency domain position, and a sequence.

Optionally, in an implementation of the present disclosure, the sending time unit, the frequency domain position or the sequence are configured by the network device.

Optionally, in an implementation of the present disclosure, the terminal device further includes a detecting unit.

The detecting unit is configured to perform PDCCH detection within a receiving window corresponding to the at least one power saving signal according to the at least one power saving signal; or not perform PDCCH detection within a receiving window corresponding to the at least one power saving signal according to the at least one power saving signal.

Optionally, in an implementation of the present disclosure, the receiving window includes a Discontinuous Reception (DRX) sending window, a paging occasion or a PDCCH search space.

Optionally, in an implementation of the present disclosure, the determining unit is specifically configured to determine the resource for receiving the at least one power saving signal according to a capability of the terminal device.

It should be understood that the terminal device 500 according to the implementation of the present disclosure may correspond to the terminal device in the method implementation of the present disclosure, and the above and other operations and/or functions of various units in the terminal device 500 are respectively for implementing corresponding processes of the terminal device in the method in FIG. 2, which will not be repeated herein for brevity.

Figure 6:
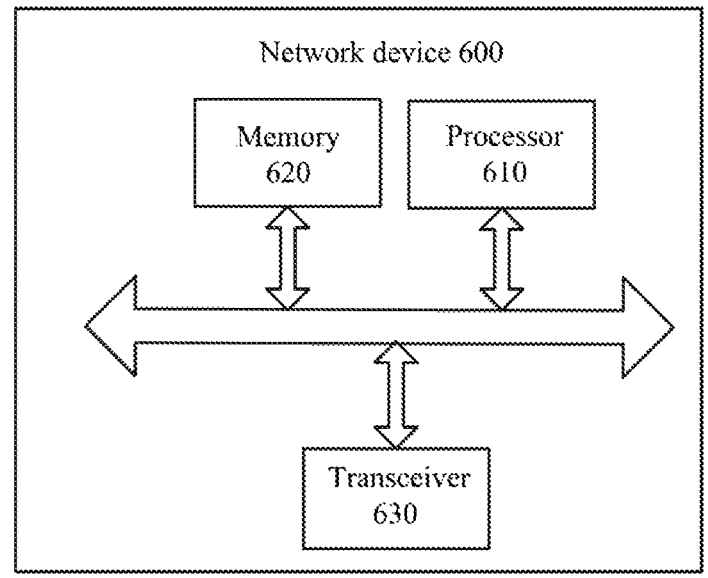
FIG. 6 is another schematic block diagram of a network device according to an implementation of the present disclosure.

As shown in FIG. 6, an implementation of the present disclosure further provides a network device 600, which may be the network device 400 in FIG. 4, and capable of being configured to perform contents of the network device corresponding to the method 200 in FIG. 2. The network device 600 shown in FIG. 6 includes a processor 610. The processor 610 may call and run a computer program from a memory to implement the method in the implementation of the present disclosure.

Optionally, as shown in FIG. 6, the terminal device 600 may further include a memory 620. The processor 610 may call and run a computer program from the memory 620 to implement the method in the implementation of the present disclosure.

The memory 620 may be a separate device independent of the processor 610 or may be integrated in the processor 610.

Optionally, as shown in FIG. 6, the network device 600 may further include a transceiver 630, and the processor 610 may control the transceiver 630 to communicate with other devices. Specifically, the transceiver 630 may send information or data to other devices, or receive information or data sent by other devices.

The transceiver 630 may include a transmitter and a receiver. The transceiver 630 may further include antennas, and a number of antennas may be one or more.

Optionally, the network device 600 may be a network device of the implementation of the present disclosure, and the network device 600 may implement the corresponding processes implemented by the network device in various methods of the implementations of the present disclosure, which will not be repeated herein for brevity.

In a specific implementation, the determining unit in the network device 600 may be implemented by the processor 610 in FIG. 6, and the sending unit in the network device 600 may be implemented by the transceiver 630 in FIG. 6.

Figure 7:
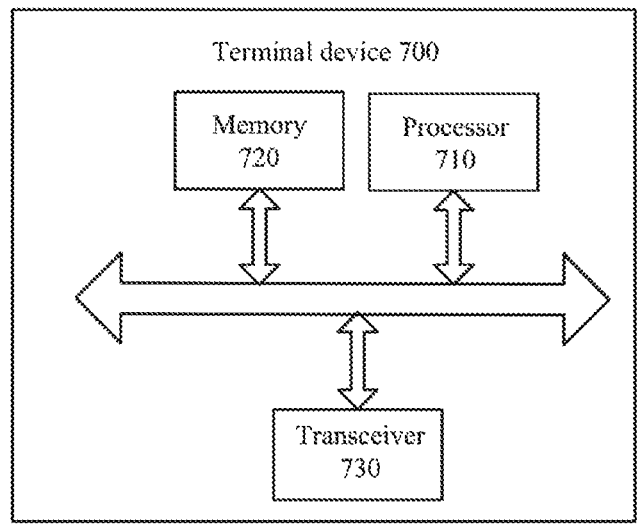
FIG. 7 is another schematic block diagram of a terminal device according to an implementation of the present disclosure.

As shown in FIG. 7, an implementation of the present disclosure further provides a terminal device 700, which may be the terminal device 500 in FIG. 5, and capable of being configured to perform contents of the terminal device corresponding to the method 300 in FIG. 3. The terminal device 700 shown in FIG. 7 includes a processor 710. The processor 710 may call and run a computer program from a memory to implement the method in the implementation of the present disclosure.

Optionally, as shown in FIG. 7, the terminal device 700 may further include a memory 720. The processor 710 may call and run a computer program from the memory 720 to implement the method in the implementation of the present disclosure.

The memory 720 may be a separate device independent of the processor 710 or may be integrated in the processor 710.

Optionally, as shown in FIG. 7, the terminal device 700 may further include a transceiver 730, and the processor 710 may control the transceiver 730 to communicate with other devices. Specifically, the transceiver 730 may send information or data to other devices, or receive information or data sent by other devices.

The transceiver 730 may include a transmitter and a receiver. The transceiver 730 may further include antennas, and a number of antennas may be one or more.

Optionally, the terminal device 700 may be a terminal device of the implementation of the present disclosure, and the terminal device 700 may implement corresponding processes implemented by the terminal device in the various methods of the implementations of the present disclosure, which will not be repeated herein for brevity.

In a specific implementation, the determining unit in the terminal device 700 may be implemented by the processor 710 in FIG. 7, and the receiving unit in the terminal device 700 may be implemented by the transceiver 730 in FIG. 7.

Figure 8:
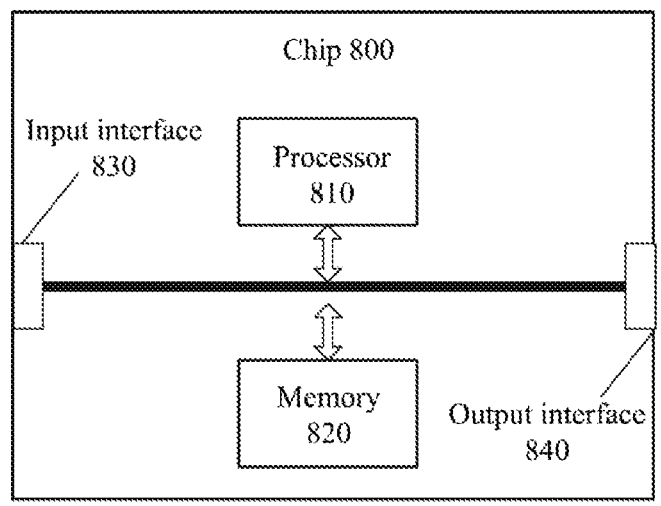
FIG. 8 is a schematic block diagram of a chip according to an implementation of the present disclosure.

FIG. 8 is a schematic diagram of a structure of a chip according to an implementation of the present disclosure. A chip 800 shown in FIG. 8 includes a processor 810. The processor 810 may call and run a computer program from a memory to implement the method in the implementation of the present disclosure.

Optionally, as shown in FIG. 8, the chip 800 may further include a memory 820. The processor 810 may call and run a computer program from the memory 820 to implement the method in the implementation of the present disclosure.

The memory 820 may be a separate device independent of the processor 810 or may be integrated in the processor 810.

Optionally, the chip 800 may further include an input interface 830. The processor 810 may control the input interface 830 to communicate with other devices or chips. Specifically, the processor 710 may acquire information or data sent by other devices or chips.

Optionally, the chip 800 may further include an output interface 840. The processor 810 may control the output interface 840 to communicate with other devices or chips. Specifically, the processor 710 may output information or data to other devices or chips.

Optionally, the chip may be applied in a network device of the implementation of the present disclosure, and the chip may implement the corresponding processes implemented by the network device in various methods of the implementation of the present disclosure, which will not be repeated herein for brevity.

Optionally, the chip may be applied in a terminal device of the implementation of the present disclosure, and the chip may implement corresponding processes implemented by the terminal device in the various methods of the implementations of the present disclosure, which will not be repeated herein for brevity.

It should be understood that the chip mentioned in the implementation of the present disclosure may be referred to as a system-level chip, a system chip, a chip system or a system-on-chip, etc.

Figure 9:
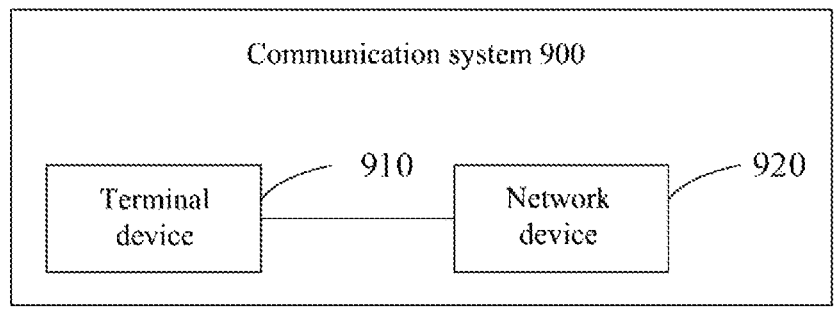
FIG. 9 is a schematic block diagram of a communication system according to an implementation of the present disclosure.

FIG. 9 is a schematic block diagram of a communication system 900 according to an implementation of the present disclosure. As shown in FIG. 9, the communication system 900 may include a terminal device 910 and a network device 920.

Herein, the terminal device 910 may be configured to implement the corresponding functions implemented by the terminal device in the above-mentioned method, and the network device 920 may be configured to implement the corresponding functions implemented by the network device in the above-mentioned method, which will not be repeated here for brevity.

It should be understood that, the processor in the implementation of the present disclosure may be an integrated circuit chip having a signal processing capability. In an implementation process, steps of the foregoing method implementations may be implemented by using an integrated logic circuit of hardware in the processor or instructions in a form of software. The processor may be a general purpose processor, a digital signal processor (DSP), an application specific integrated circuit (ASIC), a field programmable gate array (FPGA) or other programmable logic device, a discrete gate or a transistor logic device, or a discrete hardware component. The processor may implement or perform methods, steps and logical block diagrams disclosed in the implementation of the present disclosure. The general purpose processor may be a microprocessor, or the processor may alternatively be any conventional processor, or the like. The steps of the method disclosed with reference to the implementation of the present disclosure may be directly embodied to be implemented by a hardware decoding processor, or may be implemented by a combination of hardware and software modules in the decoding processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that, the memory in the implementation of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory in the systems and methods described in the document is intended to include, but is not intended to be limited to, these and any memory of other proper types.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, the memory in the implementations of the present disclosure is intended to include, but is not limited to, these and any other suitable types of memories.

An implementation of the present disclosure further provides a computer readable storage medium configured to store a computer program.

Optionally, the computer readable storage medium may be applied in a network device of the implementation of the present disclosure, and the computer program causes a computer to perform corresponding processes implemented by the network device in various methods of the implementations of the present disclosure, which will not be repeated herein for brevity.

Optionally, the computer readable storage medium may be applied in a terminal device of the implementation of the present disclosure, and the computer program causes a computer to perform corresponding processes implemented by the network device in various methods of the implementations of the present disclosure, which will not be repeated herein for brevity.

An implementation of the present disclosure also provides a computer program product including computer program instructions.

Optionally, the computer program product may be applied in a network device of the implementation of the present disclosure, and the computer program instructions cause a computer to perform corresponding processes implemented by the network device in various methods of the implementations of the present disclosure, which will not be repeated herein for brevity.

Optionally, the computer program product may be applied in a terminal device of the implementation of the present disclosure, and the computer program instructions cause a computer to perform corresponding processes implemented by a mobile terminal/terminal device in various methods of the implementations of the present disclosure, which will not be repeated herein for brevity.

An implementation of the present disclosure also provides a computer program.

Optionally, the computer program may be applied in a network device of the implementation of the present disclosure. When the computer program is run on a computer, the computer is caused to perform corresponding processes implemented by the network device in various methods of the implementations of the present disclosure, which will not be repeated herein for brevity.

Optionally, the computer program may be applied in a terminal device of the implementation of the present disclosure. When the computer program is run on a computer, the computer is caused to perform corresponding processes implemented by the terminal device in various methods of the implementations of the present disclosure, which will not be repeated herein for brevity.

A person of ordinary skill in the art may be aware that, in combination with the examples of units and algorithm steps described in the implementations disclosed in the document, the present disclosure may be implemented by using electronic hardware or a combination of computer software and electronic hardware. Whether the functions are implemented by using hardware or software depends on a particular application and a design constraint condition of the technical solution. A person skilled in the art may use different methods to implement the described functions for each particular application, but it should not be considered that such implementation goes beyond the scope of the present disclosure.

A person skilled in the art may clearly understand that, for the purpose of convenient and brief description, for a detailed working process of the foregoing system, apparatus, and unit, may refer to a corresponding process in the foregoing method implementations, which will not be repeated herein for brevity.

In the several implementations provided in the present disclosure, it should be understood that the disclosed system, apparatus, and method may be implemented in other manners. The apparatus implementations are only illustrative, for example, division of the units is only a logical function division, and there may be other division modes in actual realization. For example, multiple units or components may be combined or integrated into another system, or some features may be ignored or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected based on actual requirements to achieve the objectives of the solutions of the implementations.

In addition, various functional units in various implementations of the present disclosure may be integrated in one processing unit, or various units may be physically present separately, or two or more units may be integrated in one unit.

When the functions are implemented in the form of software functional units and sold or used as an independent product, the software functional units may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or some of the steps of the methods described in the implementations of the present disclosure. The foregoing storage medium includes: any medium that may store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or substitution readily conceived by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for transmitting a signal, comprising:
   determining, by a terminal device, a resource for receiving at least one power saving signal according to an association relationship between a first signal and a power saving signal, wherein the at least one power saving signal is associated with at least one first signal;
   receiving, by the terminal device, the at least one power saving signal on the resource for receiving the at least one power saving signal respectively;
   wherein the power saving signal is a wake up signal (WUS), the first signal comprises a synchronization signal/physical broadcast channel (SS/PBCH) block and/or a channel state information reference signal (CSI-RS);
   wherein the power saving signal and the first signal are quasi-co-located.

2. The method according to claim 1, wherein the at least one first signal is a first subset of a first set, and the method further comprises:

receiving, by the terminal device, information of the at least one first signal sent by the network device;

determining, by the terminal device, the resource for receiving the at least one power saving signal comprises:

determining, by the terminal device, the resource for receiving the at least one power saving signal according to the information of the at least one first signal.

3. The method according to claim 2, wherein the method further comprises:

performing, by the terminal device, rate matching with the power saving signal associated with the first signal in the first set according to the information of the at least one first signal.

4. The method according to claim 3, wherein performing, by the terminal device, the rate matching with the power saving signal associated with the first signal in the first set according to the information of the at least one first signal comprises:

receiving, by the terminal device, a signal other than the power saving signal on a resource for receiving the power saving signal associated with a second subset of the first set, wherein the second subset comprises a first signal other than the at least one first signal in the first set.

5. The method according to claim 1, wherein the at least one power saving signal is a plurality of power saving signals, and any two power saving signals in the plurality of power saving signals are different in at least one of following aspects: a sending time unit, a frequency domain position, and a sequence.

6. The method according to claim 5, wherein the sending time unit, the frequency domain position or the sequence are configured by the network device.

7. The method according to claim 1, wherein the method further comprises:

performing, by the terminal device, Physical Downlink Control Channel (PDCCH) detection within a receiving window corresponding to the at least one power saving signal according to the at least one power saving signal; or not performing, by the terminal device, PDCCH detection within the receiving window corresponding to the at least one power saving signal according to the at least one power saving signal.

8. The method according to claim 7, wherein the receiving window comprises a Discontinuous Reception (DRX) sending window, a paging occasion or a PDCCH search space.

9. A terminal device, comprising a processor and a transceiver, wherein the processor is configured to determine a resource for receiving at least one power saving signal according to an association relationship between a first signal and a power saving signal, wherein the at least one power saving signal is associated with at least one first signal;

the transceiver is configured to receive the at least one power saving signal on the resource for receiving the at least one power saving signal respectively;

wherein the power saving signal is a wake up signal (WUS), the first signal comprises a synchronization signal/physical broadcast channel (SS/PBCH) block and/or a channel state information reference signal (CSI-RS);

wherein the power saving signal and the first signal are quasi-co-located.

10. The terminal device according to claim 9, wherein the at least one first signal is a first subset of a first set, and the transceiver is further configured to:

receive information of the at least one first signal sent by a network device;

the processor is configured to:

determine the resource for receiving the at least one power saving signal according to the information of the at least one first signal.

11. The terminal device according to claim 10, wherein the processor is further configured to perform rate matching with the power saving signal associated with the first signal in the first set according to the information of the at least one first signal.

12. The terminal device according to claim 11, wherein the processor is configured to:

receive a signal other than the power saving signal on a resource for receiving the power saving signal associated with a second subset of the first set, wherein the second subset comprises a first signal other than the at least one first signal in the first set.

13. The terminal device according to claim 9, wherein the at least one power saving signal is a plurality of power saving signals, and any two power saving signals in the plurality of power saving signals are different in at least one of following aspects: a sending time unit, a frequency domain position, and a sequence.

14. The terminal device according to claim 9, wherein the processor is further configured to perform Physical Downlink Control Channel (PDCCH) detection within a receiving window corresponding to the at least one power saving signal according to the at least one power saving signal; or not perform PDCCH detection within the receiving window corresponding to the at least one power saving signal according to the at least one power saving signal.

15. A non-transitory computer readable storage medium, configured to store a computer program, wherein the computer program causes a computer to perform the method according to claim 1.

* * * * *